(12) United States Patent
Fergason

(10) Patent No.: US 6,350,038 B1
(45) Date of Patent: Feb. 26, 2002

(54) RIGHT ANGLE VIEWING INSPECTION DEVICE AND METHOD

(76) Inventor: James L. Fergason, 5 Alverno Ct., Redwood City, CA (US) 94061

( * ) Notice: Subject to any disclaimer, the term of this patent is extended or adjusted under 35 U.S.C. 154(b) by 0 days.

(21) Appl. No.: 09/587,069

(22) Filed: Jun. 2, 2000

Related U.S. Application Data

(60) Provisional application No. 60/137,353, filed on Jun. 3, 1999.

(51) Int. Cl.$^7$ .................................................. G02B 5/08
(52) U.S. Cl. ...................... 359/857; 359/858; 359/855; 359/856
(58) Field of Search ................................. 359/857, 858, 359/855, 856; 356/246, 437, 218, 222, 225, 234, 152.2

(56) References Cited

U.S. PATENT DOCUMENTS

| | | | | |
|---|---|---|---|---|
| 3,785,738 A | * | 1/1974 | Hoppke | 356/239 |
| 4,623,955 A | * | 11/1986 | Santini | 362/135 |
| 5,170,167 A | * | 12/1992 | Rix et al. | 342/11 |
| 5,861,956 A | * | 1/1999 | Bridges et al. | 356/375 |
| 5,867,264 A | * | 2/1999 | Hinnrichs | 356/310 |
| 5,914,759 A | * | 6/1999 | Higuchi et al. | 349/57 |
| 6,059,417 A | * | 5/2000 | Tatoian | 359/856 |
| 6,210,009 B1 | * | 4/2001 | Daly | 359/882 |

\* cited by examiner

Primary Examiner—Mohammad Sikder
(74) Attorney, Agent, or Firm—Renner, Otto, Boisselle & Sklar LLP

(57) ABSTRACT

A viewing device for viewing a relatively inaccessible gap between two closely positioned surfaces, such as a circuit component and a circuit board, may be viewed by a device including a first reflector which reflects light from the gap to a relatively accessible location for viewing. The first reflector is connected to a support which can be a bar or platform. Additionally a second element such as a second reflector or a threaded post can be included. Where the viewing device includes a first and second reflector connected by a platform support, the support may include a pair of threaded post holes on either side of a scored region. The support may be broken along the scored region to form two separate devices. The reflectors can be right angle prisms and may reflect light by total internal reflection or by a reflective coating.

36 Claims, 9 Drawing Sheets

RIGHT ANGLE VIEWING INSPECTION DEVICE AND METHOD

This application claims the benefit of U.S. Provisional Application No. 60/137,353, filed Jun. 3, 1999, the entire disclosure of which is incorporated by reference.

FIELD OF THE INVENTION

The present invention relates generally, as indicated, to an inspection device and method using the same, and, more particularly, to an inspection device and method that facilitate obtaining a view of a device and/or area that ordinarily is difficult to access.

BACKGROUND OF THE INVENTION

Many electronic printed circuit boards (PCB) manufactured which utilize current technology use surface mounted components. That is, the components are soldered directly to metal pads or areas on the surface of the board to make electrical connections between the component and circuits on the board and to secure the component to the board. This is contrasted with techniques in which elongate leads of the component are soldered into plated metal holes going through the board. Soldering components directly to the PCB surface is known as surface mounted technology (SMT). The term "component" is broadly construed here as, for example, an integrated circuit, integrated circuit component, integrated circuit package, electronic component, and/or other devices, and these and other various terms used herein for components or equivalent devices are intended to be inclusive of various components with which the present invention may be used.

Many SMT components have leads that are located underneath the component package. One example is components referred to as plated leaded chip carriers (PLCC). Another example uses as the leads balls on the bottom of the component that are soldered to conductive pads or receptacle areas, e.g., concave areas, of a circuit board; such arrangement of balls and this type of connection technique sometimes is referred to as a ball grid array (BGA).

It is desirable to be able to inspect connections between such electronic components and the like and the board to which they are attached. For example, inspection may be used to verify proper connections, to find faults, e.g., an open circuit or a short circuit, and in some cases it may be possible while using a view obtained during an inspection to repair a discovered fault. Viewing and inspection may be used to see whether the connection procedure appears to have been carried out correctly and/or for other purposes.

The problem of looking at surface mounted components has been addressed in the past by using a number of instruments such as direct video viewing binocular microscopy and bore scopes. With the advent of more complex integrated circuits or like packages it has become more difficult to inspect the leads on many packages primarily because the leads are connected to the board underneath the electronic packages. This makes it even more difficult to see a desired view even by rotating the package vertically.

An apparatus and method for viewing a workpiece or the like is disclosed in copending U.S. patent application Ser. No. 09/114,987, filed Jul. 14, 1998, the entire disclosure of which is hereby incorporated by reference. Such apparatus and method use a camera to obtain an image of a workpiece and for displaying an enlarged image for viewing. Such apparatus includes techniques for aligning the camera and/or associated optics to obtain a desired view. An exemplary use of such apparatus and method include viewing and inspecting the connections between leads of an electrical or electronic component and a printed circuit board and in some cases facilitating the viewing of a faulty connection while that connection is being repaired and/or after a repair has been made.

However, it is difficult to view the leads and connections of leads of SMT components, such as a PLCC or a BGA of an integrated circuit component or package, mounted on a circuit board. These leads and connections cannot be viewed for inspection from the straight vertical because the leads are beneath the component and are not usually exposed at a side edge thereof. To view such leads and connections the board must be tilted at extreme angles for inspection. Additionally, SMT components are very small and must be viewed at some level of magnification to insure proper inspection for defects. This can be very difficult as higher level magnification inspection products, such as microscopes and video cameras, reduce working distance and make PCB manipulation for proper focus beneath the magnifier almost an art form. Although magnification instruments can be tilted to locate the SMT device within the field of view, accurate alignment and refocusing usually are required and make the process laborious. Additionally, although it is desirable to obtain a view looking in a direction parallel to the plane of the circuit board to view the complete edge solder ball(s) of a BGA device, PLCC device or similar device in which the connections are somewhat hidden, this usually is not possible even with tilting instruments which are able to be tilted to a direction that is 90 degrees to a direct view looking down at the top of the board, because other PCB components usually obstruct the view.

As a result expensive top down X-ray or ultrasonic analysis is often employed when inspecting these packages. Although X-ray or ultrasonic analysis is required to detect solder voids beneath interior balls in BGA packages, there is a need for a cost effective right angle viewing device that will detect common problems such as lead misalignment and solder shorts between leads and solder balls. Although the device will not eliminate the need for X-ray for solder voids, it will avoid a need to use expensive X-ray to find visible defects.

Because of their design and height restrictions mirrors, such as dental mirrors and other right angle mirrors, are difficult to use to view the SMT packages mounted on circuit boards, such as PLCCs and BGAs. Usually there is minimum space to place a dental mirror type device, for example. Also, it is difficult to align such a relatively large mirror type device. Additionally, if space were available for use of a dental mirror or the like, such mirrors would only obtain a limited view, for example, a view of the upper versus the lower part of the package, which is soldered to the board. Further, such mirrors can be relatively heavy and have a relatively large footprint, and, therefore, if it were to engage the circuit board, it could easily damage the board (including, for example, the board itself, conductive traces, coatings, solder connections, components, etc.).

Dental mirrors and other relatively large mirrors are difficult to manipulate accurately in close spaces to obtain a full view of, for example, solder connections under a BGA SMT component, solder connections thereof, etc., as well as of the surfaces of the component facing the board and the surface of the board facing the component. Further, it is difficult to obtain suitable lighting to illuminate the viewed area.

It will be appreciated that there is a strong need in the art to view relatively small objects and/or to view such objects where there is relatively small clearance to obtain the view.

It also will be appreciated that there is a strong need in the art to improve the viewing and inspecting of electrical and electronic components or the like and their connection or attachment to a circuit board or the like, especially in small or tight spaces.

SUMMARY OF THE INVENTION

According to an aspect of the present invention a viewing device for viewing a relatively inaccessible gap area between two closely positioned surfaces including a first reflector for reflecting a first view of at least part of a first gap area to a first relatively accessible location, a second reflector for reflecting a second view of at least part of a second gap area to a second relatively accessible location, and a support connecting the first and second reflectors together. In several exemplary embodiments, for example, reflectors can be right angle prisms and the reflectors can reflect the light by total internal reflection or by another reflection technique, such as surface reflection, reflection by a coating, dielectric mirror, etc.

According to another aspect of the present invention, a viewing device for viewing a relatively inaccessible gap area between two closely positioned surfaces including a reflector for reflecting a view of at least part of the gap area to a relatively accessible location, and a support supporting the reflector in a stable position relative to the gap area to obtain the view. In several exemplary embodiments, for example, reflectors can be right angle prisms and the reflectors can reflect the light by total internal reflection or by another reflection technique, such as surface reflection, reflection by a coating, dielectric mirror, etc.

According to another aspect of the present invention a viewing device for viewing a relatively inaccessible gap area between two closely positioned surfaces including a first reflector for reflecting a first view of at least part of a first gap area to a relatively accessible location, a second reflector for reflecting a second view of at least part of a second gap area to a second relatively accessible location, and a support connecting the first and second reflectors together, wherein the support is scored along the center to facilitate separation of the support into first and second support portions, the support portions each including a threaded post hole for use with a threaded post.

According to another aspect of the present invention a method of viewing a relatively inaccessible gap area between two closely positioned surfaces including placing a reflector adjacent relatively inaccessible gap area to view the gap from a relatively accessible location, and supporting the reflector from at least two locations to stably maintain the reflector relative to the gap area.

According to another aspect the method further includes adjusting a threaded post position the reflector to view the gap area. The adjusting of the threaded post may be performed electronically and may be controlled according to the view of the electronic viewing device.

According to another aspect of the present invention a method of making a pair of devices for viewing a relatively inaccessible gap area between two closely positioned surfaces includes forming a structure having a pair of reflectors for connecting a support, breaking the support into two pieces, and adding a threaded post to each of the two pieces of the support.

According to an aspect of the present invention a prism optically relays an angular view of a surface mounted feature.

According to another aspect a right angle prism optically relays a 90 degree view of a surface mounted feature.

According to another aspect a right angle prism is provided for optically relaying a 90 degree view of a surface mounted feature, the optical relay causing the image to be inverted so the view will be from the surface of the PCB upward facilitating viewing of the most critical solder joint of, for example, an SMT connection.

According to another aspect different axial length prism devices can be used to relay images of several SMT leads and connections and even of entire rows of leads and connections for viewing at a time.

According to another aspect the invention permits light to be projected beneath packages and turned at an angle, for example, a right angle or other angle, through the prism so that solder or other blockages may be detected beneath an SMT device connected to a circuit board.

According to another aspect a device is provided to relay a view of an object, such as an SMT device and/or its connection to a circuit board, the device being of relatively light weight and having a small footprint where it may engage the circuit board, thereby to minimize the possibility of damaging the circuit board or components thereon during use to obtain the view.

According to another aspect a support is provided for a prism device used to relay an image of SMT connections between an SMT device and a circuit board and/or for a prism device used to illuminate such SMT connections.

According to an aspect of the present invention a right angle prism is provided to optically relay a 90 degree view of one or more surface mounted features. The image presented will be from the surface of the PCB upward so that the most critical solder joint can be seen because the view is inverted. Additionally, different length prism devices can be positioned so that entire rows of leads can be viewed at a time. Another feature of this invention permits light to be projected beneath packages and turned at right angles through the prism so that solder or other blockages may be detected.

According to an aspect of the invention a new method of and apparatus for examining electronic packages or components at right angles so that leads may be inspected underneath the packages or components are provided. A right angle prism is mounted so that reflected light from the package can be seen from above or alternatively using a second right angle prism light can be introduced into that prism and viewed on the other side of the package through the other prism. This allows any viewing device to be used above the print circuit board on which the package or component is mounted to see (obtain a view) horizontal to the board. This overcomes the inability to illuminate and to see and inspect even with relatively high density arrangement of components on most boards. The device can be placed on the board at the component to be inspected and the device allows on to see under the component without expensive fiber optics or other complicated devices such as endoscopes.

According to another aspect, undesired light collection and/or reflection by one or both prisms is reduced or eliminated by light absorption or light scattering, e.g., using a light absorber or light scatterer.

According to another aspect, one or both mentioned prisms may be mounted on a bar or other support which allows the device to be placed on a printed circuit board while bridging the component or package to be examined. The bridge can either be permanently affixed so as to give a fixed distance and precise alignment or it can be a variable width so as to be adjustable for any package. A further advantage to this type of device is its ease of manufacture and its low-cost in volume production. A device of this type could be placed on a print circuit board at critical points during manufacture and left in place to provide later inspection in critical manufactured parts.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
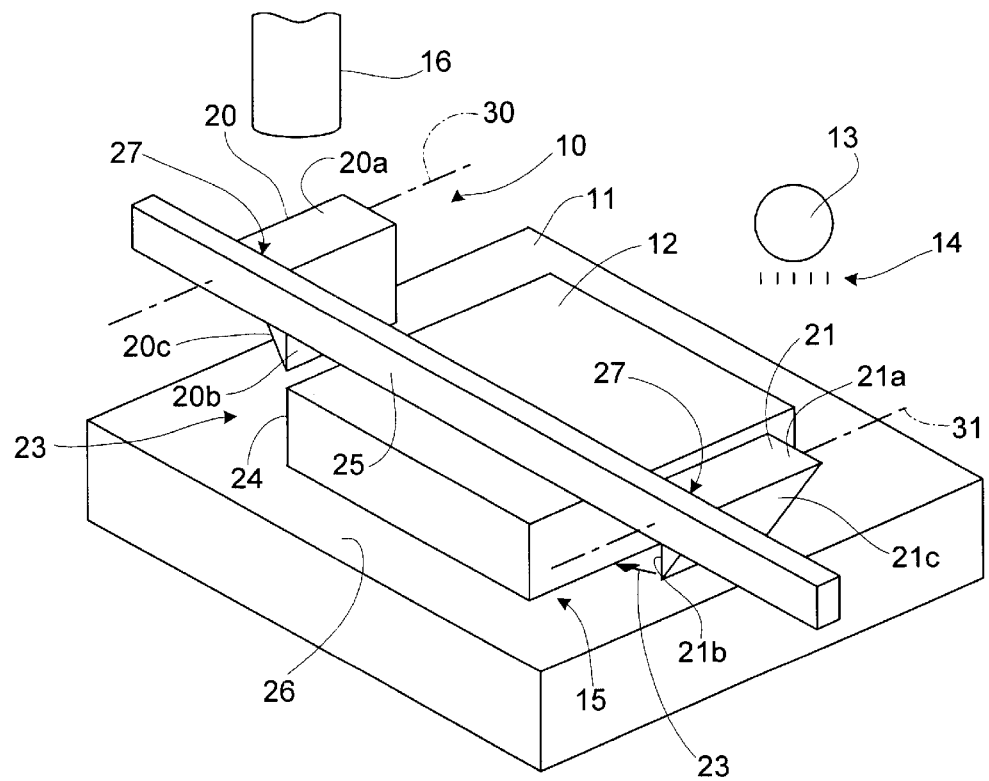
FIG. 1 is an isometric view of a right angle viewing device according to the invention positioned relative to a surface mounted component on a circuit board.
Figure 2:
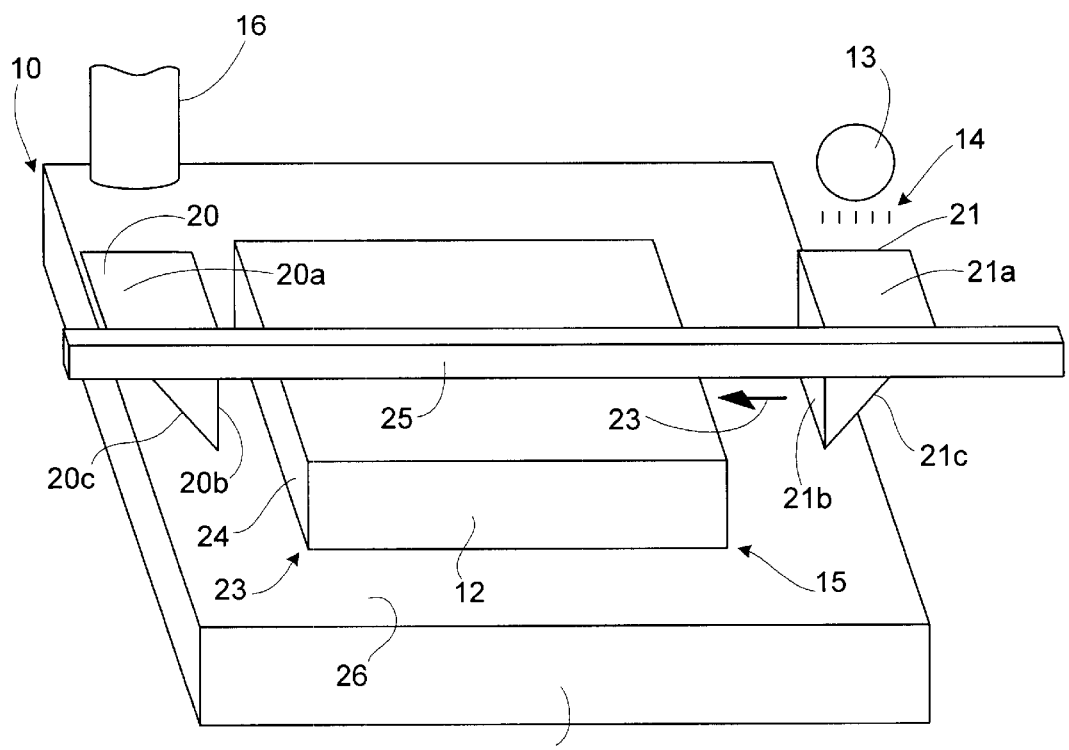
FIG. 2 is a substantially front isometric view similar to FIG. 1 also showing the right angle prism device according to the invention positioned relative to a surface mounted component on a circuit board.
Figure 3:
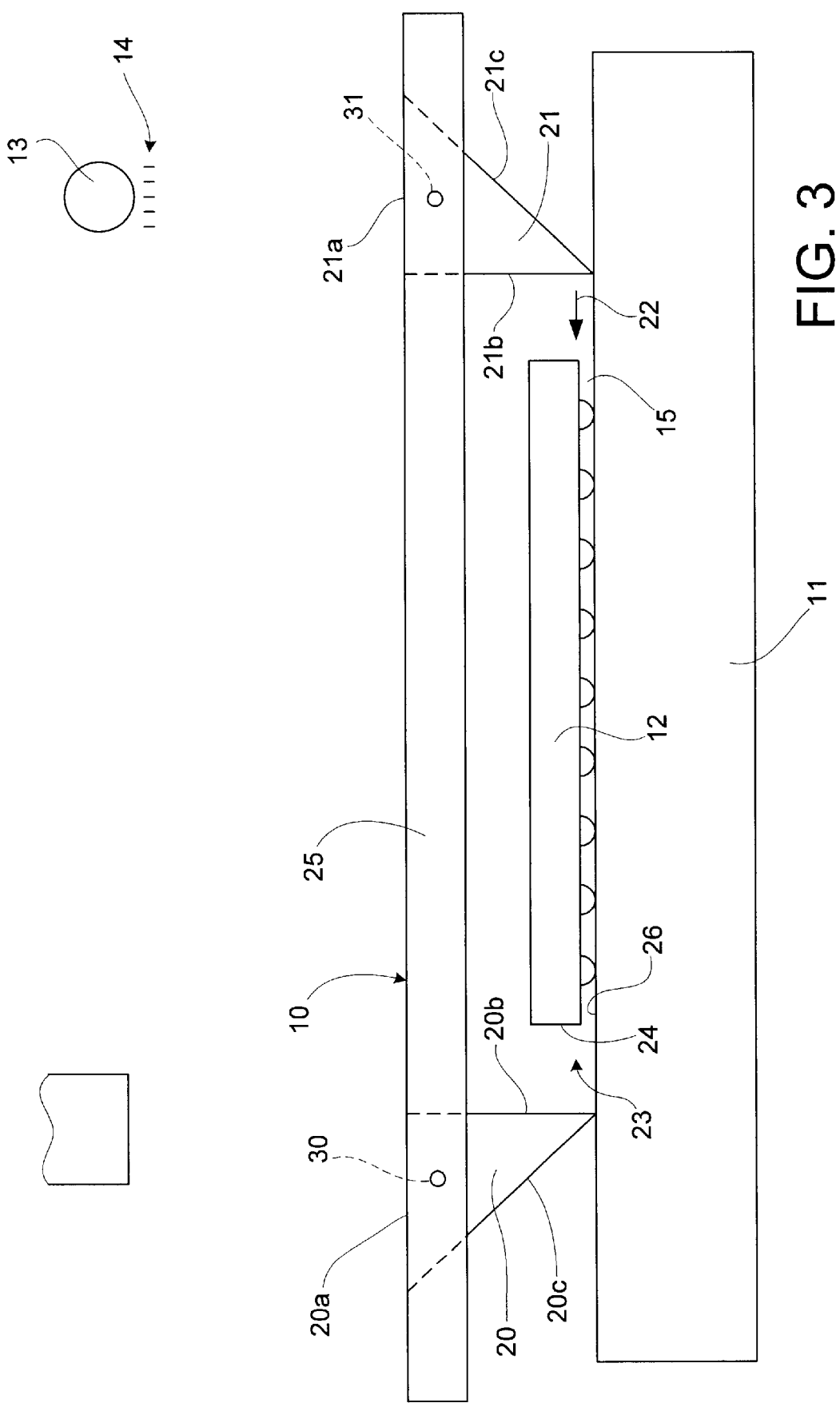
FIG. 3 is a schematic side elevation view of the right angle viewing device according to the invention positioned relative to a surface mounted component on a circuit board.

Referring in detail to FIGS. 1–3 of the drawings, wherein like reference numerals designate like parts in the several figures, a right angle viewing device in accordance with the present invention is generally indicated at 10. The device 10 is positioned on a printed circuit board 11 on which an electric component 12, e.g., an SMT component, is mounted and may be used to inspect the component 12 and its connection and/or interface with the circuit board 11. A light source 13 provides light 14 to the device 10 which directs some of the light in the space 15 between the board 11 and component 12, and the device 10 also directs light to a viewing device 16, such as a viewing device of the type disclosed in U.S. patent application Ser. No. 09/114,987 (mentioned above) or some other viewing device.

The device 10 in the illustrated embodiment includes a pair of prisms 20, 21, which preferably are right angle prisms that have two prism faces 20a, 20b, 21a, 21b at right angles to each other, and a reflecting face 20c, 21c, such as shown. An alternate embodiment of device 10' illustrated in FIG. 4 only uses one prism 20. As illustrated, the prisms 20, 21 are identical, but it will be appreciated that the prisms 20, 21 may be different from each other. Also, in the illustrated embodiment the dimensions of the right angle surfaces 20a, 20b, for example, are the same so that the angle the surface 20c makes with each of the right angle surfaces at the intersections thereof is 45 degrees. The surfaces 21a, 21b, 21c are similarly related to each other. However, it will be appreciated that other angular relations may be used and are within the spirit and the scope of the invention. The prisms 20, 21 preferably are made of plastic, polymer, glass or some other material which is suitably clear and transparent to transmit light 14 and to transmit light representing an image for viewing by the viewing device 16.

The surfaces a, b, c of the respective prisms 20, 21 preferably are flat and smooth and do not distort light transmitted therethrough or reflected thereby. The index of refraction of the material of which the prisms 20, 21 are made preferably is selected so that the reflective surfaces 20c, 21c of the prisms are operative to reflect, e.g., as by total internal reflection, at least some of the light incident thereon as such light is transmitted in the respective prism from a respective surface 20a, 21a and/or 20b, 21b. Alternatively or additionally, the surfaces 20c, 21c may include a coating to reflect incident light in the prism. Therefore, for example, in using the device 10, light 14 from the light source 13 may be transmitted into the prism 21 via the surface 21a thereof, be reflected by the surface 21c thereof and be directed out from surface 21b as light following a path 22 into the space 15. Light following the path 22 received at the surface 20b of the prism 20 is incident on the surface 20c thereof and is reflected by surface 20c to the surface 20a thereof, where the light exits the prism 20 and can be collected for viewing by the viewing device 16 thereby allowing the viewing device 16 to be used to inspect the component 12 and connections thereof to the circuit board 11. Inspection may be by a person viewing an image of the area under inspection and/or by automated or semi-automated equipment.

Figure 4:
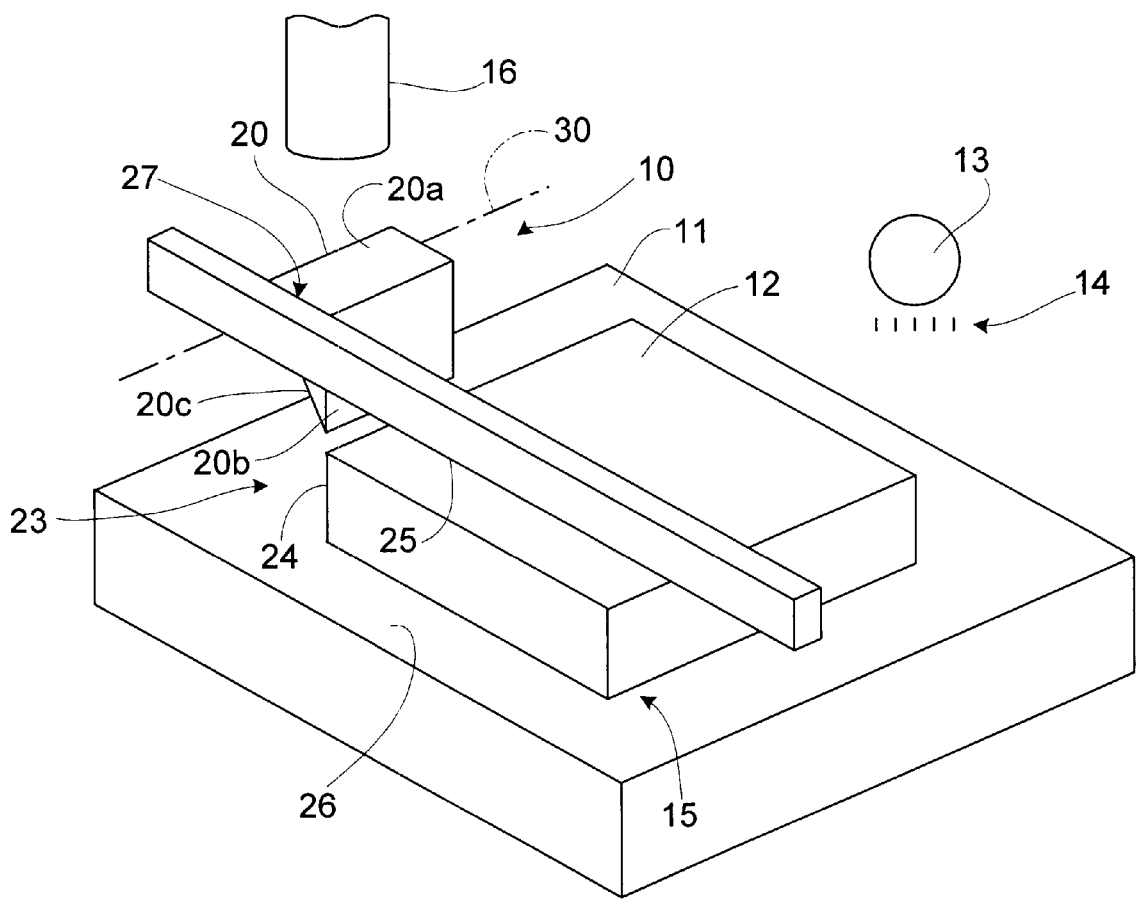
FIG. 4 is an isometric view of a right angle viewing device according to an embodiment of the invention using a single prism positioned relative to a surface mounted component on a circuit board.

The viewing device 16 may be positioned to operate through the prism 20 to obtain a view of the area 23 of the board 11 and component 12 including, for example, a side 24 of the component 12, the nearby area of the circuit board 11, and the space 15 therebetween. That view may be obtained with or without light 14 provided from the source 13. Without such light, the nature of connections between balls and solder pads, receptacles or the like where the board 11 and component 12 are attached can be viewed or inspected by light reflected therefrom via the prism to the viewing device 16. If light 14 from the source 13 is used to provide illumination along the path 22 via the prism 21, then inspection using the viewing device 16 and prism 20 allows the user to see whether or not light is properly is transmitted in the path 22 where there is not intended to be a ball, solder pad, solder, etc.; if light is blocked along path 22 where the light is intended to be transmitted, this may be an indication of a bad solder connection, short circuit, or some other defect. These are just several examples of use for the device 10 and the device 10 may be used for other purposes. The device 10' may be used with only a single prism 20 to obtain a view of the area 23 as is illustrated in FIG. 4, or, if desired, the device 10 may be used with two prisms 20, 21. The use of two prism 20, 21 will not only obtain a view of the area 23 but is also able check light transmission along path 22.

A support such as a bar 25 is connected to the prisms 20, 21. If only a single prism is used, for example, prism 20, the bar 25 is connected only to that prism, the prism 21 being eliminated in such an embodiment. In the illustrated embodiment, however, the bar 25 is of a length to bridge the component 12 while allowing the prisms 20, 21 to rest on respective edges or apexes 20d, 21d (of each) on the surface 26 of the circuit board 11. The materials of which the prisms 20, 21 and bar 25 are made preferably are relatively light weight so that although the prisms are resting on the surface 26, they would not tend to damage the circuit board 11, components thereon, traces thereon, etc. Further, since the edges 20d, 21d of the prisms 20, 21 are relatively sharp, and in any event have relatively small surface area, they do not tend to disturb components on the circuit board 11 and do not require substantial space to allow them to be positioned on the board.

In an embodiment, the spacing between the surfaces 20b, 21b of the prisms 20, 21 as mounted on the bar 25 is such that the device 10 can be placed relative to a component 12 so that the prisms 20, 21 are as close as is reasonably possible to the component 12, on the one hand, to avoid interference with other components on the board 11 and, on the other hand, to avoid interference with any of the connections between the component 12 and the board 11.

In an embodiment, the prisms 20, 21 are made of glass, a plastic or a polymer material, examples being acrylic or Lexan™. The bar 25 may be of any material including the same material as the prisms 20, 21. For example, the bar 25 may be a plastic or polymer material. The bar 25 may be adhered to the prisms 20, 21 using an adhesive material at the intersection or confronting surfaces thereof, e.g., as at 26. The adhesive material at the areas 26 may be a solvent, which allows the materials of which the prisms 20, 21 and the bar 25 are made to be joined at a substantially integral structure; the adhesive may be some other material, e.g., an epoxy material, glue or some other material. If desired, the prisms 20, 21 and the bar 25 may be molded as by plastic injection molding or some other technique, as a single integral structure. Other means and methods also may be used to form the prisms 20, 21 and bar 25.

In the illustrated embodiment using two prisms 20, 21 and the bar 25, the device 10 rests on the board 11 while the bar provides a bridge over the component 12 and holds the prism 20, 21 in fixed relative relation to each other. That relation in the illustrated embodiment is such that the "a" surfaces 20a, 21a of each prism are in parallel to each other, the "b" surfaces 20b, 21b are parallel to each other and the "c" surfaces 20c, 21c are perpendicular to each other (as for the surfaces "c" the planes in which those surfaces 20c, 21c are located would intersect along a line as planes that are perpendicular to each other).

If desired the prisms 20, 21 may be mounted on the support 24 as to slide or be relatively moveable on the support 24 or to be mounted at any of several locations on the bar 25 to allow for adjusting the spacing between the prisms 20, 21 to accommodate different respective size components 12. Furthermore, if desired, the angular relation of the respective prisms 20, 21 to the bar 25, e.g., relative to an axis 30 may be adjustable to allow for modifications in the view obtained via a prism and picked up by a viewing device 16.

Using the device 10, light reflected from the component 12 at the area of the area 23 can be viewed by the viewing device 16 allowing for inspecting of solder connections and possible flaws at the area of the area 23 in the space 15 proximate the area 23. Alternatively, the light 14 from the source 13 can be directed by the prism 21 through the space 15 to be viewed as transmitted (or not transmitted) light as a representation of the quality, for example, integrity, etc. of the solder connections or flaws therein in the space 15 between the board 11 and component 12.

The length of each prism 20, 21, for example, the distance along the respective axes 30, 31 may be approximately that illustrated as to correspond approximately to the input view or input pupil of the viewing device 16 or somewhat larger than the input view. Alternately, if desired, the length of the prisms 20, 21 may be larger or smaller than that illustrated. A relatively large length allows a view of the entire area 23, for example, without having to move the device 10 although the viewing device 16 may have to be used in a direction parallel to the axis 30. However, a relatively long prism risks encounter with non-flat or smooth areas of the circuit board 11 which may distort positioning and/or availability of a clear, full view of the area 23, whereas a relatively smaller length prism facilitates accurate positioning for optimum viewing of an area 23.

As is illustrated in FIG. 4, if only a single prism, e.g., prism 20, is used in the device 10', which is similar to the device 10 but with one rather than two prisms, the bar 25 may be so positioned as to rest on the component 12 or on some other device or support to obtain proper or desired positioning of the prism 20 for viewing the area 23. The viewing device 16 may be manipulated to optimize the view obtained from the surface 20a of the prism 20 to correspond with the possibility that the prism surface 20b is not precisely perpendicular to the plane of the circuit board 11.

Figure 5:
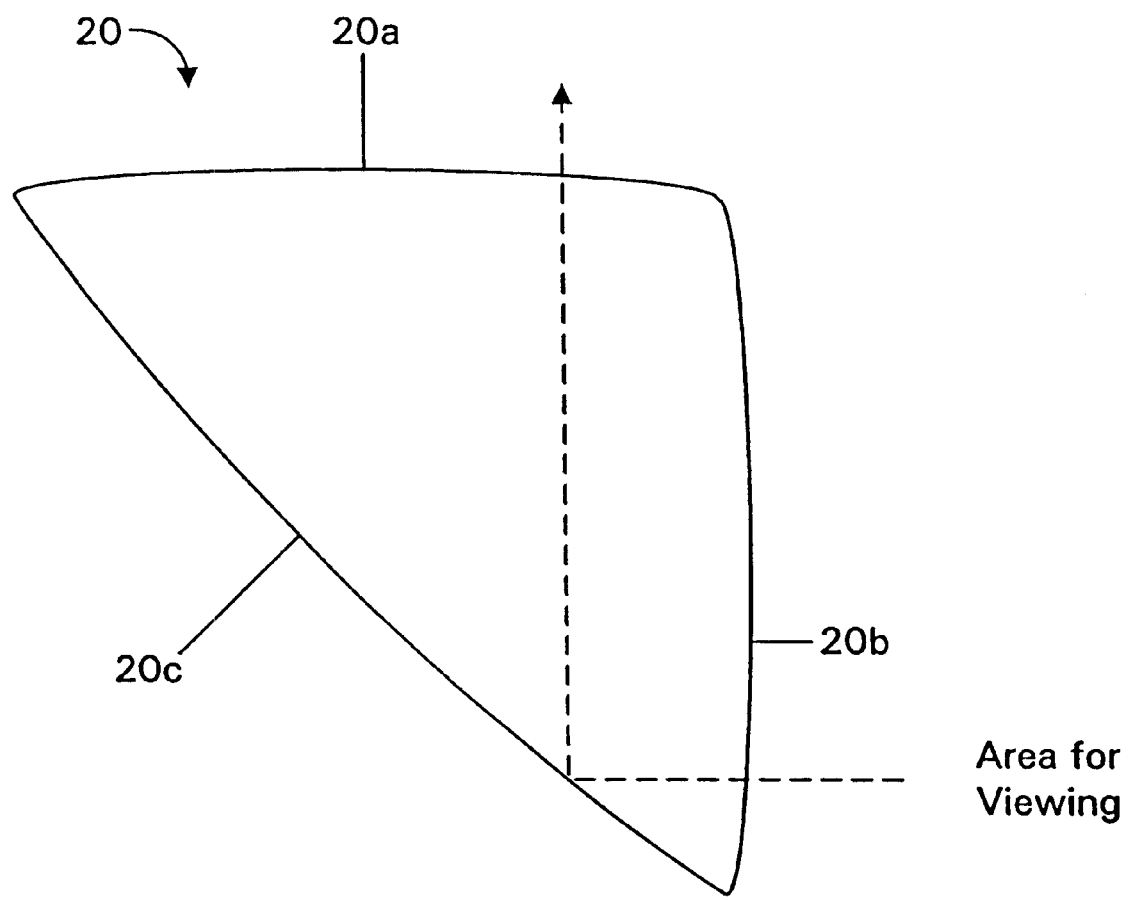
FIG. 5 is an isometric view of a prism having a lens function at each surface.

If desired, the surfaces 20a, 20b, 20c, 21a, 21b and/or 21c of respective prisms 20, 21 may be formed in such a way as to provide a lensing function, e.g., a lens or lens array to focus, enlarge, etc., light transmitted and/or reflected thereby. For example, a prism 20 with each of its surfaces 20a, 20b, 20c having a lens function, e.g., the surface forming a lens, is illustrated in FIG. 5.

It has been found that bright spots, lines or areas may be caused due to the prism 20 (or 21) collecting and reflecting some of the light illuminating the area 23 or otherwise illuminating the component 12 for viewing. Such collecting tends to concentrate light at the area of the apex 40 of the prism 20 (or 21 ) where the surfaces 20b and 20c (or 21b, 21c) meet. Such collected light tends to be excessively bright and may appear as a bright line or area when viewed by an individual using the viewing device 16.

The bright light tends to wash out a view of the edge area 23, solder connections and/or balls of the ball grid array, for example, at the edge area 23. Thus, the bright light degrades the image obtained by the viewing device and viewed by a user.

Figure 6:
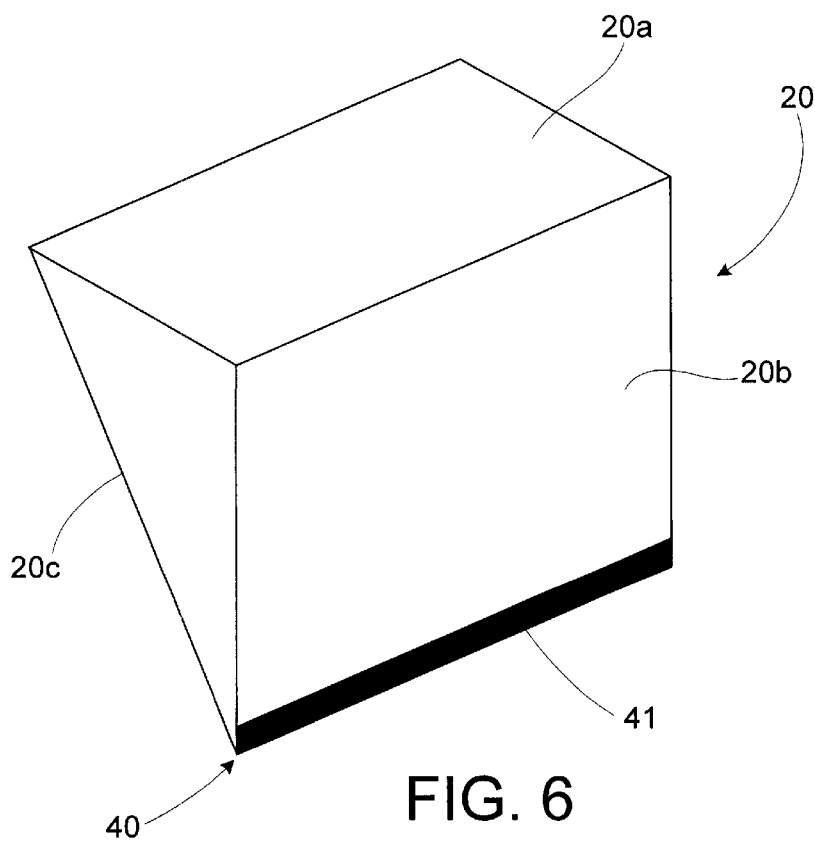
FIG. 6 is an isometric view of a prism with a light absorber at an apex.

Such light collection and/or resulting image degradation can be reduced or eliminated by the techniques illustrated in FIGS. 6 and/or 7.

In FIG. 6 the prism 20 has a light absorber 41 at the area of the apex 40. The light absorber 41 may be black paint, marking ink or other material painted or otherwise applied to the apex 40. The absorber 41 may be a dye or other light absorbing material formed as an integral part of the prism 20 at the apex 40, e.g., during molding thereof. Other light absorbing techniques also may be used. The light absorber 41 absorbs or at least reduces reflection of at least some light within the prism 20 which is incident on the area of or near the apex 40 and, thus, reduces or eliminates the bright light reflection mentioned above.

Figure 7:
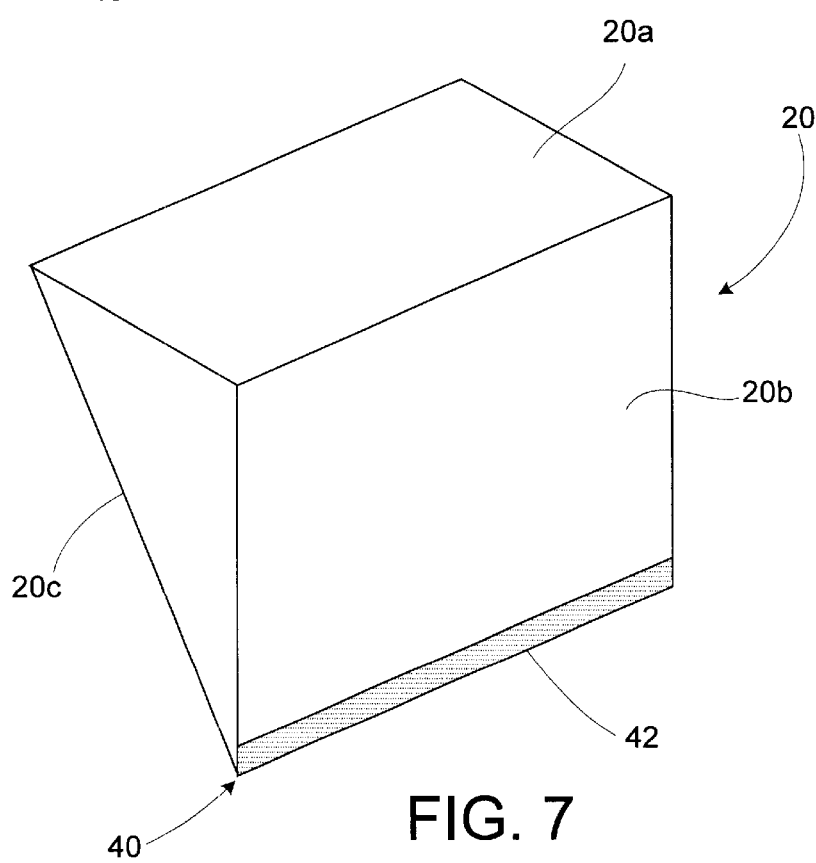
FIG. 7 is an isometric view of a prism with a light scatterer at an apex.

In FIG. 7 the prism 20 has a light scatterer 42 at the apex 40. The light scatterer 42 may be, for example, a roughening of the prism surface in the area of the apex 40. Such roughening may be by rubbing with a rough material, e.g., sand paper, garnet paper, steel wool or other rough material. If desired the roughening may be by grit blasting or sand blasting. The roughening may be provided by a rough surface in a mold in which the prism 20 is molded or cast. In operation of a prism 20 with a light scatterer 42, the light scatterer 42 tends to scatter light both within and out of the prism 20 so that the amount of light concentration that causes the undesirable bright area or line is reduced as is the brightness or existence of the intensified light bright area or line.

The light scatterer 41 may be included in either prism 20, 21 or in both of the prisms 20, 21. Similarly light absorber 42 may be included in either prism 20, 21 or in both of the prisms 20, 21. Alternatively, the light scatter 41 may be in one of the prisms 20, 21 and the light absorber 42 may be in the other one of the prisms 20, 21.

Figure 8:
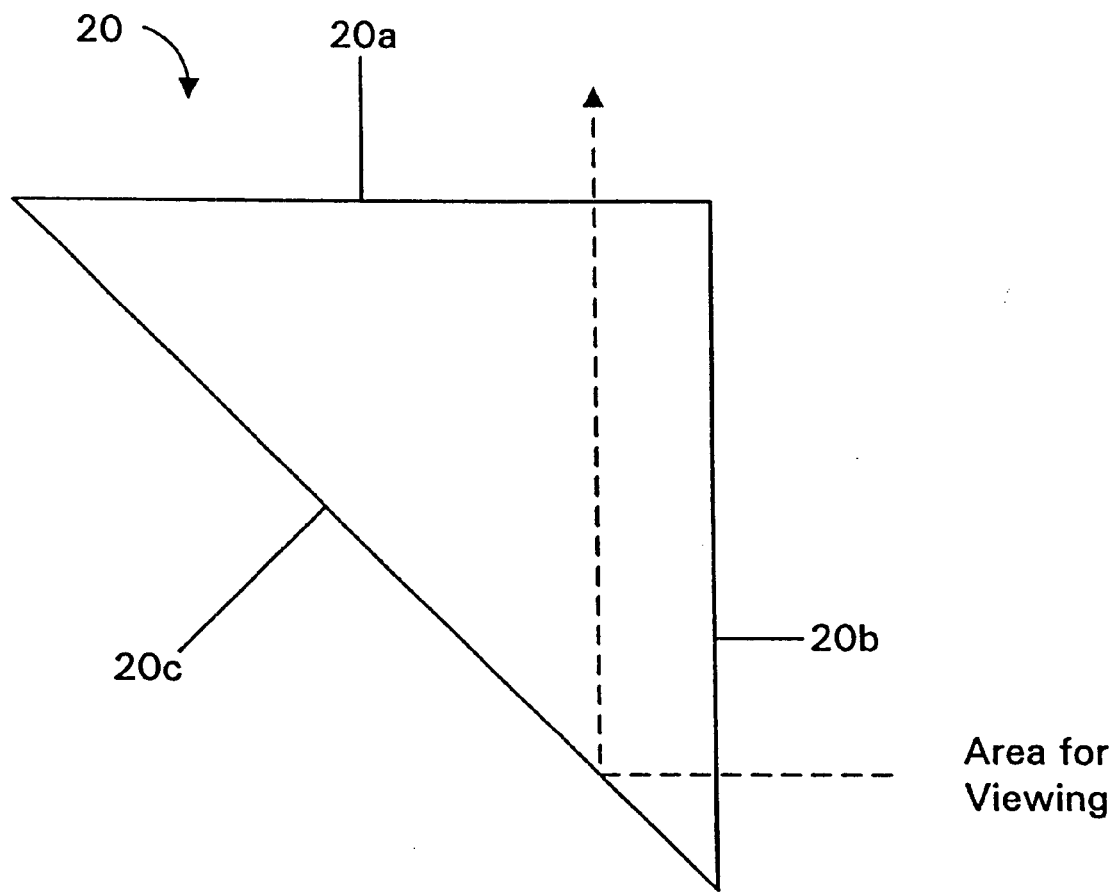
FIG. 8 is a cross sectional view of a prism showing the path light travels.

FIG. 8 shows the path in which light for viewing will travel while utilizing the present invention. Specifically, light from an area for viewing will travel toward the prism 20 and then enter the prism 20 at the prism surface 20b. Next, the light will reach reflective prism surface 20c where it will be reflected toward the other prism surface 20a. The reflection may occur through total internal reflection or because of a reflective coating located on the reflective surface 20c. Prior to the reflection at the reflective surface 20c, the light travels along a path 50 which can only be viewed from a relatively inaccessible position. However, after the light has been reflected by the reflective surface 20c, the light travels along a different light path 51 and exists the prism 20 from another prism surface 20a. The light which travels along path 51 can be viewed from a relatively accessible position thereby facilitating the ease of inspection. As shown in FIG. 8, light path 50 is substantially perpendicular to light path 51, although the light paths 50 and 51 need not be perpendicular.

Figure 9:
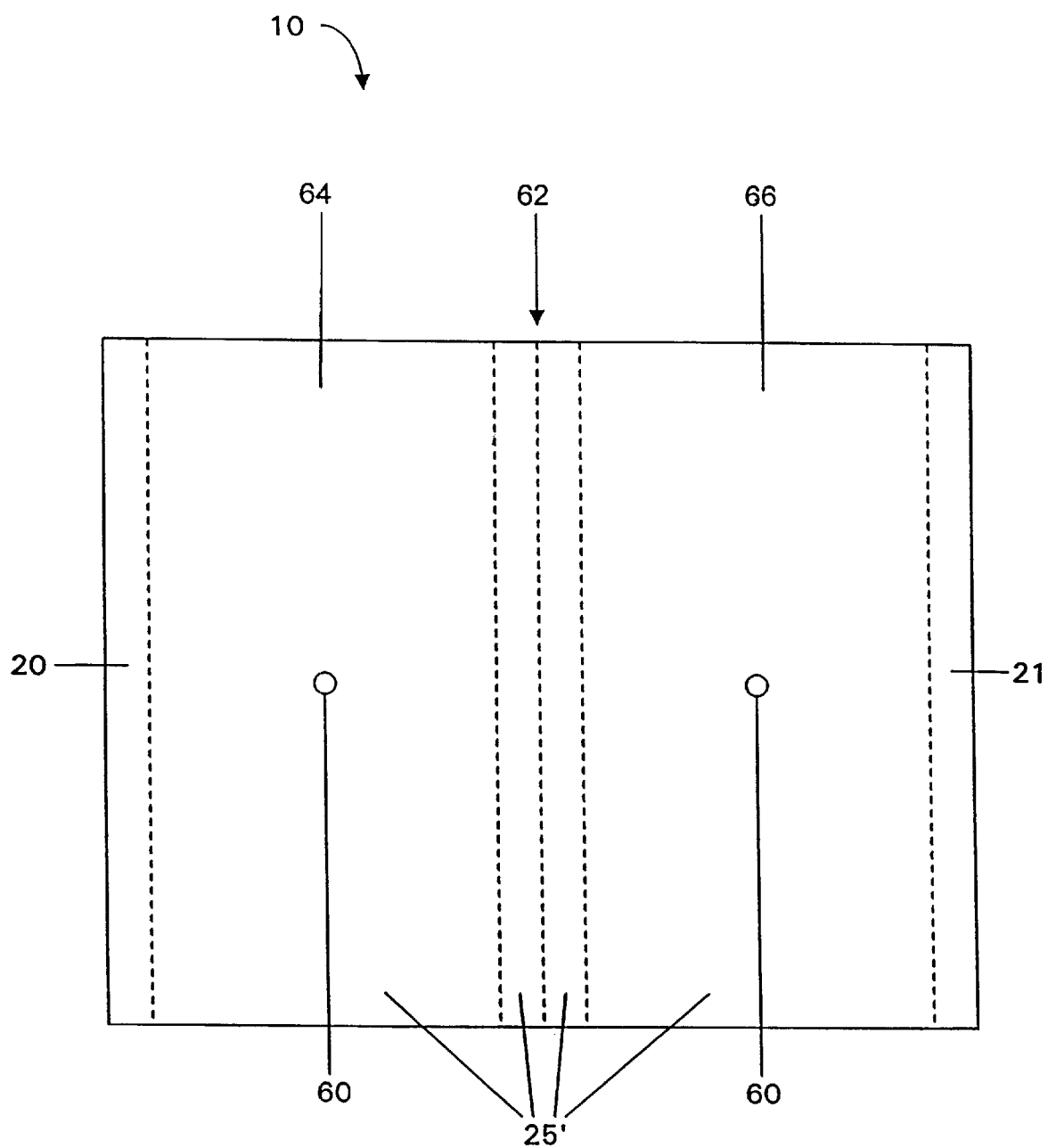
FIG. 9 is a top view of a device according to the invention having a scored support with threaded post holes.

FIG. 9 is a top view of another embodiment of the right angle viewing device 10. In this embodiment the support is a platform 25' instead of a bar 25. At one end of the platform 25' is prism 20 and at the other end of the platform is the other prism 21. The platform 25' also includes a pair of threaded post holes 60 which are on opposite sides of a scored region 62. The scored region 62 divides the platform 25' into a first support region 64 and a second support region 66.

Figure 10:
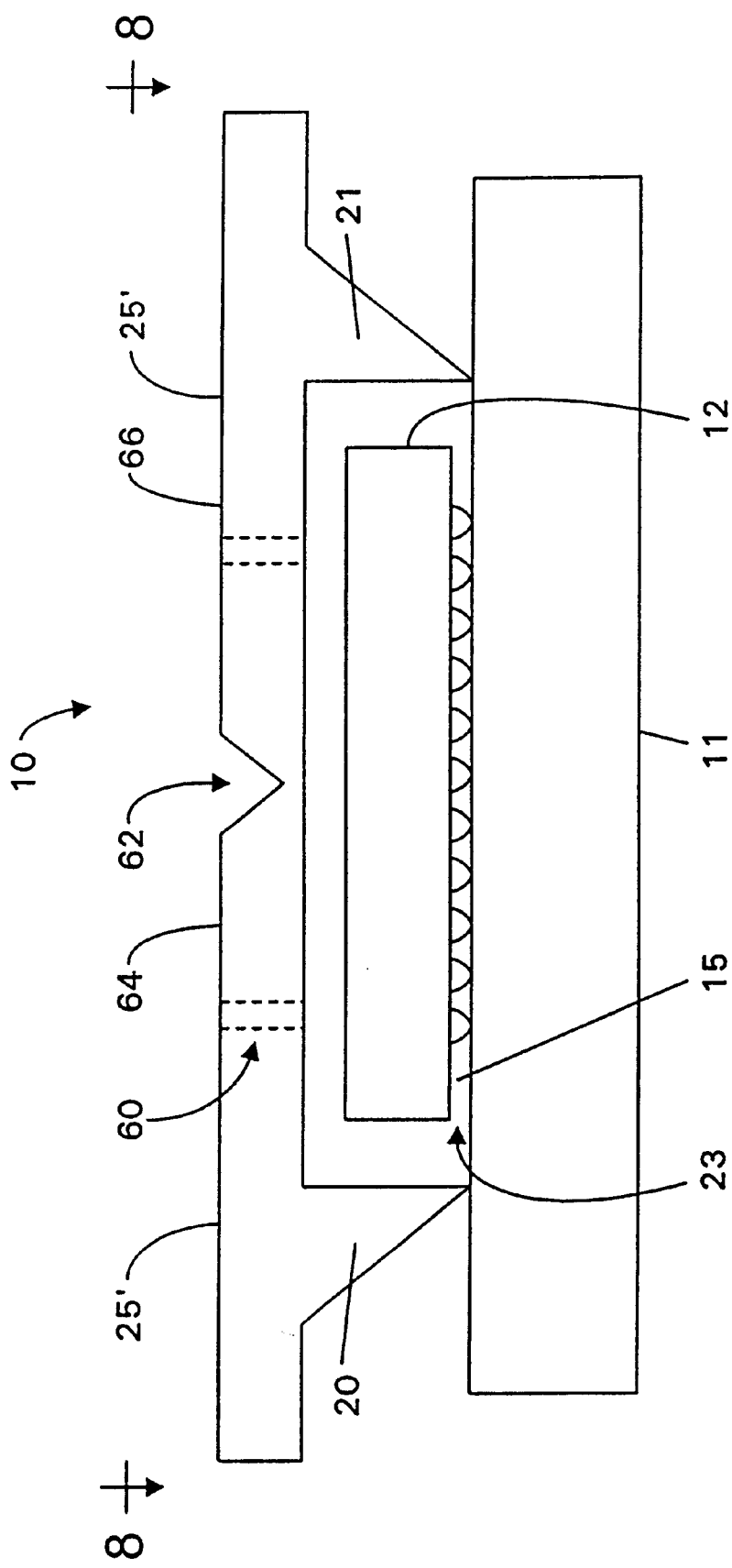
FIG. 10 is a schematic side view of the device of FIG. 9 positioned relative to a surfaced mounted component on a circuit board.

FIG. 10 is a cross-sectional view of the right angle viewing device 10 of FIG. 9. The right angle viewing device 10 of FIG. 10 functions substantially the same as the right angled viewing device 10 of FIG. 3. However, the support 25' in FIG. 10 includes a scored region 62 which may be broken to form two separate devices. One such device includes the prism 20 and the first support region 64. A second device includes the prism 21 and the second support region 66.

Figure 11:
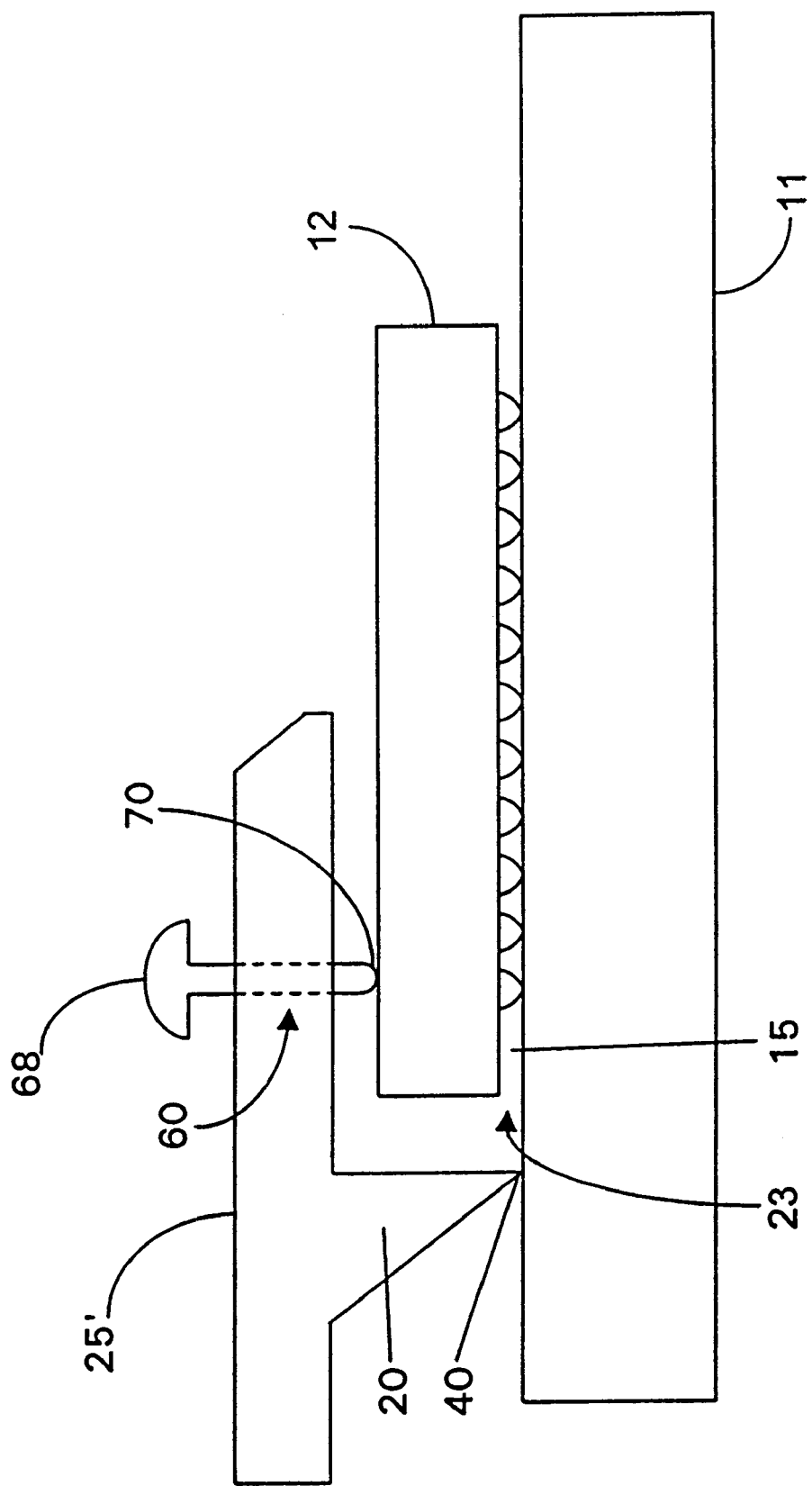
FIG. 11 is a schematic side view of the device according to the invention after being broken along the score of the support and position relative to a surface mounted component on a circuit board.

FIG. 11 is a schematic side view of the right angle viewing device 10 according to the invention after being broken along the scored region 62 of the platform 25' and position relative to a surface mounted component 12 on a circuit board 11. The support 25' can rest on the component 12 in the same manner as the right angle viewing device 10 of FIG. 4. Alternatively, a threaded post 68 can be placed into threaded post hole 60 to provide an adjustable support location. The threaded post 68 can be rotated within the threaded post hole 60 to adjust the relative position of prism 20 to the viewed area 23. The rotation of the threaded post 68 can be done manually by a user or can be done automatically by, e.g., an electric motor. The electric motor could be controlled by the user or could be controlled by an electronic viewing device in order to automate the inspection process.

The right angle viewing device 10 of the present invention provides a sample image of a viewed area because the right angle viewing device 10 and the space 15 formed between the surfaces of the circuit board 11 and the component 12 are maintained in a relatively stable fashion by having two support locations. For example, in FIGS. 1, 2, 3 and 10 the support locations are located where the apexes 40 of prisms 20–21 meet the circuit board 11 and in FIG. 10 the support locations are where the apex 40 of prism 20 meets circuit board 11 and where the end 70 of threaded post 68 meets the surface of component 12. Alternatively, the end 70 of the threaded post 68 could form a support location elsewhere, such as where the end 70 of the threaded post 68 meets the circuit board 11.

Using the invention with right angle prisms of the type described, the device 10 is able to provide an optical relay of a 90 degree view of a surface mounted feature or device on a circuit board. The view is inverted and, therefore, the image presented to the viewing device 16 will be from the surface of the circuit board 11 upward so that the most critical solder joint can be seen.

With the forgoing in mind, then it will be appreciated that the invention allows for the threaded post 68 to be moved up and down relative to the support platform 25'. This can be achieved by rotating the threaded post 68 such as a screw would rotate. Alternatively, a rotational element could be coupled to the threaded post 68 which rotates causing the threaded post to move up or down within the support platform 25' without the threaded post 68 being caused to rotate. This avoids the possibility that the rotational motion of the threaded post 68 will cause damage to the component 12, circuit board 11 or other elements. However, it is possible to use any adjustment mechanism which causes a post to move up or down.

With the forgoing in mind, then, it will be appreciated that the invention allows for the viewing and inspecting of SMT devices and other devices on circuit boards or other devices in relatively densely packed arrangement, especially when it is desired to view a surface, area or space, such as the area 23, space 15, etc. described above. Although the device is expected to be place on the circuit boards or other devices for a short period of time, the device also may be permanently affixed thereon.

The present invention has certain advantages over the prior art. For example the footprint of the right angle viewing device 10, specifically the apexes of 40 of the prisms 20, 21 and/or the end 70 of the threaded post 68, allow the present invention to be used with electronic devices that are densely packed. The right angle viewing device 10 of FIG. 10 provides easy use with standard size circuit components as well as easy adaptability to other circuit sizes and arrangements. The simple yet adaptable design is cost effective since only a single design is required for both the typical and atypical circuit arrangements.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A viewing device for viewing a relatively inaccessible gap area between two closely positioned surfaces of a substrate and an electronic component on the substrate, comprising:

a first prism reflector for reflecting light to at least part of the gap area of a first relatively inaccessible location;

a second prism reflector for reflecting a view of at least part of the gap area to a relatively accessible location;

each of said first and second Prism reflectors having an apex for resting on the substrate;

a support fixedly attached to and connecting said first and second reflectors together in fixed alignment to provide a fixed optical path relation from one reflector to the other reflector, wherein light directed to one of said reflectors is re-directed in the gap area and then toward the other reflector while the apex of each prism reflector rests on the substrate and at least part of said support is over the component.

2. The device of claim 1, wherein the first and second reflectors are right angle prisms.

3. The device of claim 2, wherein light reflected by the prisms is reflected by total internal reflection.

4. The device of claim 2, wherein light reflected by the prisms is reflected by a reflective coating.

5. The device according to claim 1, wherein the reflectors are made from an injection molded transparent polymer.

6. The device according to claim 1, wherein each reflector further comprising a lens.

7. The device according to claim 1, wherein the reflectors are permanently affixed to a board.

8. The device according to claim 1, further comprising at least one of a light scatterer and a light absorber at an apex of at least one of the reflectors.

9. The device according to claim 1, wherein at least the first and second reflectors position the device in a stable position relative to the gap area.

10. The device according to claim 1, wherein the device has a small footprint.

11. The device according to claim 1, wherein the support is scored along the center to facilitate separation of the support into first and second support portions.

12. The device according to claim 11, wherein the support portions each include a threaded post hole for use with a threaded post.

13. A viewing device for viewing a relatively inaccessible gap area between two closely positioned surfaces, respectively, of a circuit board and an electronic component, comprising:

a first reflector for reflecting a view of at least part of the gap area to a relatively accessible location;

a second reflector for directing light into the gap area to illuminate the same for viewing;

said reflectors comprising prism reflectors having respective apices for positioning on the substrate;

a support coupling the reflectors together in fixed relation allowing the reflectors to rest on the respective apices on the circuit board while the support is over the component and is supporting the reflectors in a stable position relative to the gap area to obtain the view.

14. The device according to claim 13, wherein at least one of the reflectors comprises a right angle prism.

15. The device according to claim 13, wherein at least one of the reflectors comprises injection molded transparent polymer.

16. The device according to claim 13, wherein at least one of the reflectors is permanently affixed to a board.

17. The device according to claim 13, further comprising a threaded post.

18. The device according to claim 17, wherein the threaded post adjustably positions at least one of the reflectors so that selected portions of the gap area may be viewed from above the surfaces.

19. The device according to claim 13, wherein one reflector is a mirror image of the other reflector.

20. The device according to claim 19, the support connects the reflectors together in fixed optical relation.

21. The device according to claim 13, wherein the support including a thin section to facilitate breaking therealong to form a first support portion and a second support portion; and the first support portion including a first threaded post hole for a first threaded post and the second support portion including a second threaded post hole for a second threaded post.

22. The device according to claim 21, wherein the first support portion, the first reflector and the first threaded post form a first device for viewing a relatively inaccessible gap area; and the second support portion, the second reflector and the second threaded posts form a second device for viewing a relatively inaccessible gap area.

23. The device according to claim 13, further comprising at least one of a light scatterer and a light absorber at an apex of at least one of the reflectors.

24. The device according to claim 13, wherein the device has a small footprint.

25. A viewing device for viewing a relatively inaccessible gap area between two closely positioned surfaces of a substrate and an electronic component positioned with respect to the substrate, comprising:

a first prism reflector for reflecting a first view of at least part of a first gap area to a first relatively accessible location;

a second prism reflector for reflecting a view of at least part of a second gap area to a second relatively accessible location; and a support connecting the first and second reflectors together so as not to pivot relative to each other and to permit the respective prisms to rest on the substrate in close proximity to the gap area while the support extends over at least part of the component, wherein the support is scored along the center to facilitate separation of the support into first and second support portions, the support portions each including a threaded post hole for use with a threaded post.

26. A method of viewing a relatively inaccessible gap area between two closely positioned surfaces of an electronic component and a circuit board, comprising:

placing a first prism reflector adjacent a relatively inaccessible gap area to direct illumination into the gap area;

placing a second prism reflector adjacent a relatively inaccessible gap area to view the gap area from a relatively accessible location while the gap area is illuminated via the first prism reflector;

wherein each of said first and second prism reflectors has an apex; and supporting the prism reflectors by a support attached to both prism reflectors and extending over at least part of the electronic component and by the respective apices on the circuit board to stably maintain the reflectors relative to gap area.

27. The method according to claim 26, further comprising adjusting a threaded post to position at least one of the reflectors to view the gap area.

28. The method according to claim 27, wherein the adjusting the threaded post is performed electronically.

29. The method according to claim 28, further comprising viewing a view of the gap area via the second prism reflector using an electronic viewing device.

30. The method according to claim 29, further comprising controlling the threaded post according to the view of the electronic viewing device.

31. The method according to claim 26, further comprising viewing a view of the gap area via the second prism reflector using an electronic viewing device.

32. A method of making a pair of devices for viewing a relatively inaccessible gap area between two closely positioned surfaces of a circuit board and an electronic component positioned with respect thereto, comprising:

forming a structure having a pair of prism reflectors connected by a fixed support attached to the prism reflectors;

breaking the support into two pieces to provide two respective portions, each including a shortened support portion and a prism reflector fixedly attached thereto; and adding a threaded post to each of the two shortened support portions.

33. The method according to claim 32, wherein the adding of the threaded post is performed after breaking the support into two pieces.

34. The method according to claim 32, wherein forming the structure is performed by injection molding.

35. A viewing device for viewing a relatively inaccessible gap are between two closely positioned surfaces of an electronic component and a substrate comprising:

a reflector for reflecting a view of at least part of the gap area to a relatively accessible location;

a support supporting the reflector in a stable position relative to the gap area to obtain the view while extending over at least part of the electronic component;

further comprising another reflector;

wherein the another reflector is a mirror image of the reflector;

the support connects the reflectors together;

wherein the support includes a thin section to facilitate breaking the support to form a first support portion and a second support portion; and the first support portion including a first threaded post hole for a first threaded post and the second support portion including a second threaded post hole for a second threaded post.

36. The device according to claim 35, wherein the first support portion, the reflector and the first threaded post form a first device for viewing a relatively inaccessible gap area between two closely positioned surfaces; and the second support portion, the another reflector and the second threaded posts form a second device for viewing a relatively inaccessible gap area between two closely positioned surfaces.

* * * * *